Sept. 13, 1949.        J. L. DEFFENBAUGH              2,481,727
                          TRACTOR TRACK
Filed June 3, 1946                                2 Sheets-Sheet 1
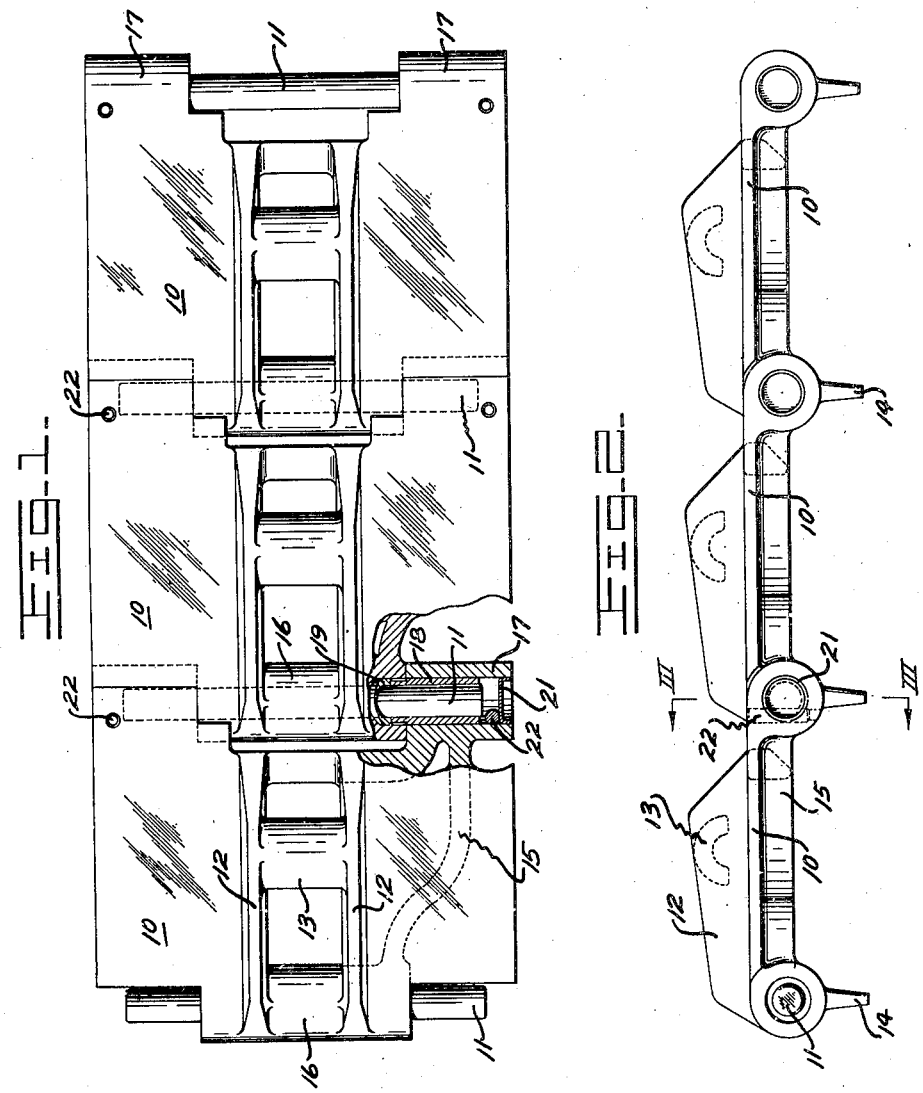
INVENTOR.
John L. Deffenbaugh
BY
Charles M. Fryer
ATTORNEY.

Sept. 13, 1949.  J. L. DEFFENBAUGH  2,481,727
TRACTOR TRACK
Filed June 3, 1946  2 Sheets-Sheet 2
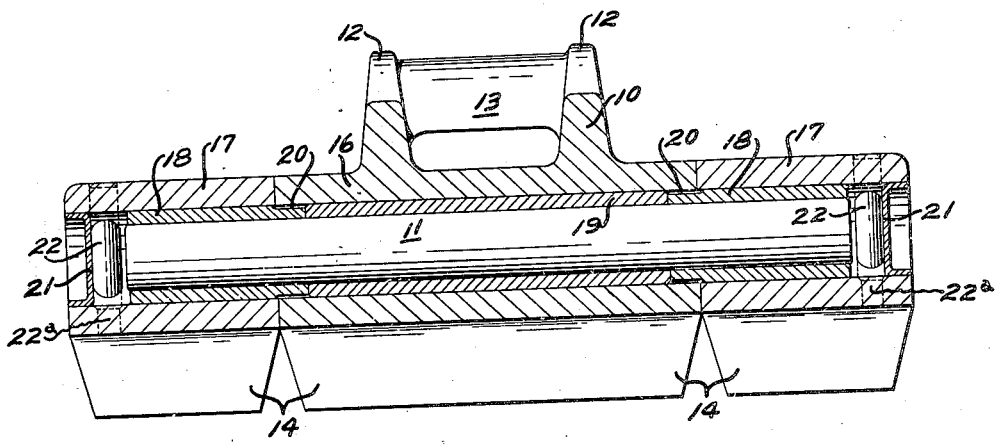
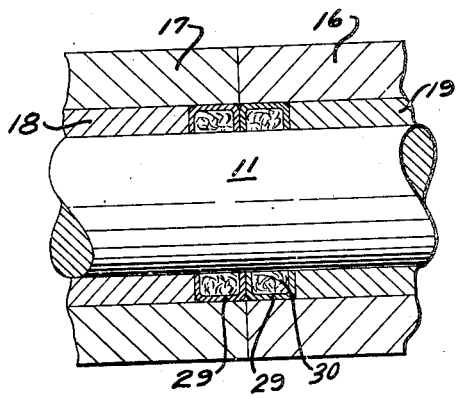  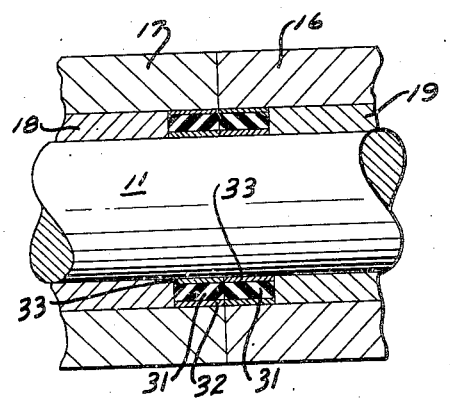
INVENTOR.
John L. Deffenbaugh
BY Charles M. Fryer
ATTORNEY.

Patented Sept. 13, 1949

2,481,727

UNITED STATES PATENT OFFICE 2,481,727

TRACTOR TRACK

John L. Deffenbaugh, Peoria, Ill., assignor to Caterpillar Tractor Co., San Leandro, Calif., a corporation of California Application June 3, 1946, Serial No. 674,068

1 Claim. (Cl. 305—10)

The present invention relates to tracks for track-type tractors or other similar vehicles and pertains particularly to the track pins or pivotal connections between the shoes which make up the tracks.

Owing to the severe nature of the service to which tracks are subjected and to the environment in which they operate, the pivotal bearing connections between the track shoes constitute points at which considerable wear takes place. Ordinary methods of lubricating bearings and pivotal connections have not proven successful in overcoming excessive wear at these points as dust and other abrasives have an affinity for oil and grease and in many cases the lubricant acts as a carrier for the abrasive substances through which the tracks operate and therefore increases rather than reduces the wear which takes place. The track shoes are necessarily constructed of a relatively soft or malleable material to withstand service which would be destructive to harder brittle materials. The track pins which are necessarily of hard steel or the like therefore wear into the metal of the shoes and the loose fit which results effects imperfect operation and eventually breakage or failure.

It is an object of the invention to overcome the foregoing and other disadvantages of conventional tractor tracks and to provide an improved track of simple and durable construction which embodies a floating track pin operating against hard surfaces and protected against the abrasive action of dust and other foreign material. Further objects and advantages of the invention are made apparent in the following specification wherein reference is made to the accompanying drawings.

In the drawings:

Fig. 1 is a plan view of a portion of a tractor track illustrating three of its track shoes which are pivotally connected together by a hinge joint constructed in accordance with the present invention, parts of the view being broken away to clarify the illustration;

Fig. 2 is a view in side elevation of the structure illustrated in Fig. 1;

Fig. 3 is an enlarged vertical transverse sectional view taken on the line III—III of Fig. 2;

Fig. 4 is an enlarged fragmentary section illustrating a modification of a portion of the structure shown in Fig. 3; and Fig. 5 is a similar view illustrating a further modification of the same portion.

The track of which a portion is illustrated in Figs. 1 and 2 is made up of a plurality of track shoes 10 which are hinged or pivotally connected with each other as by track pins 11 so that a complete set of track shoes may form an endless chain of track shoes adapted to be trained over a drive sprocket and an idler sprocket as is customary to form the track assembly of a track type tractor or similar vehicle.

Each of the track shoes 10 herein illustrated is formed as a substantially rectangular plate which has parallel sprocket guide webs 12 on its back surface and lugs 13 disposed between said webs for engagement by the teeth of a conventional drive sprocket. Each of the track shoes 10 may also be provided with ground engaging lugs 14 on its opposite side and with suitable reinforcing ribs such as are indicated at 15. The construction and arrangement of these several parts may vary without affecting the advantages that are provided by the hinge connection of the present invention.

Each of the track shoes 10 is provided with a single hinge lug 16 at one of its ends and a spaced pair of hinged lugs 17 at its opposite end, all of said lugs 16 and 17 being bored for reception of the track pin 11 by means of which the shoes 10 are hingedly connected. Because of the fact that the track shoes with their hinged connections operate over the ground and are subjected to mud, dust, and other abrasive materials which make up the environment in which they operate, these hinged connections have given rise to considerable difficulty. The present invention provides means for permitting the hinged pins 11 to float freely under conditions where they are sealed against the entry of foreign matter which might be destructive to their bearing engagement with the track shoes.

As is most closely illustrated in Fig. 3, the hinge lugs 17 of each track shoe are provided with press fitted bearing bushings 18 which provide a bearing for the end portions of the pin 11. The single hinge lug 16 of the adjacent track shoe is provided with a press fitted bearing bushing 19 which also receives and supports the bearing pin 11 adjacent its central portion. The bearing bushing 19 is somewhat shorter than the hinge lug 16 so that it may be centrally positioned therein, leaving spaces between each of its ends and the ends of the lug 16. The bearing bushings 18 have slightly reduced inner end portions arranged to project into said spaces at the ends of the bearing lug 16 to provide annular channels shown at 20 which extend from the abutting surfaces of the lugs 16 and 17 to the abutting ends of the bushings 18 and 19. Because of this construction the entry of abrasive substances toward the track pin 11 is inhibited by the irregular path which such substances must take and any small quantity of abrasive substances entering between the abutting ends of the lugs 16 and 17 will tend to remain in the annular spaces 20 rather than to find its way through to the bearing surface of the pin 11.

The open outer ends of the hinge lugs 17 are closed against the entry of abrasive substances preferably by plugs 21 press fitted and frictionally retained therein. These plugs are inexpensive pressed metal parts which may be pierced and pried out with any suitable tool when their removal becomes necessary. As the track pin is freely rotatable with relation to all of the bearing bushings 18 and 19 it is also free to float or move longitudinally and such movement is limited by stop pins 22 which, as shown in Figs. 1 and 3, are pressed through suitable holes formed in positions intercepting the hinge pin bores in the hinge lugs 17. The pins 22 are preferably inserted downwardly, or from the upper surfaces of the track shoes as they are illustrated in Fig. 3, and may be either tapered or straight and are frictionally retained in place. If desired, slightly smaller bores, shown in dotted lines 22a, may be continued through the lower surfaces of the track shoes to enable the pins to be driven upwardly and out of place when it is desired to remove them for the purpose of disassembling the track. An advantage of the arrangement of the stop pins herein shown is that they act by engagement with the ends of the track pins 11 and therefore do not interfere with the floating disposition of the pin 11 and do not require the pin to be bored or shouldered in any manner which would tend to weaken it.

A modified form of seal designed for use adjacent the abutting ends of the hinge lugs 16 and 17 is illustrated in Fig. 4 wherein both the bearing bushings 18 and 19 are shown as terminating short of the ends of the hinge lugs to provide recesses for the reception of conventional sealing members 29. The members 29 are made up of annular metal cases of channel shaped cross section press fitted into the ends of the hinge lugs 16 and 17 and containing suitable packing shown at 30 for engagement with the surface of the track pin 11.

A still further modification of this sealing means is illustrated in Fig. 5 in which the spaces between the ends of the bearing bushings 18 and 19 and their respective hinge lugs 17 and 16 contain annular seals of rubber or similar resilient material shown at 31. Each resilient sealing member 31 is disposed between metal rings 32 and 33 to which it is securely bonded. The rings 32 are press fitted into the bores of the lugs 16 and 17 and the rings 32 are similarly fitted in close contact with the outer surface of the hinge pin 11. The slight pivotal movement necessary for the operation of the structure is made possible by the resilience of the resilient substance 31 and the actual bearing surfaces of the pin 11 are protected against the entrance of abrasive materials.

With the invention herein described, the hinge pin 11 has free bearing contact with the hardened bushings 18 and 19 and as abrasive substances are prevented from entering the areas of such contact bearing wear is reduced to a minimum. The hinge connection between the track shoes may be operated as herein illustrated without lubricant or it may be assembled with lubricant and a supply of lubricant may be contained in the spaces between the ends of the bearings pins 11 and the plugs 21 which close the open ends of the hinge lugs 17.

I claim:

A hinge connection between shoes of a tractor track which comprises spaced hinge lugs on one shoe, a single hinge lug on an adjacent shoe for reception between the hinged lugs, said lugs having aligned bores, bushings fitted in the bore of each lug, a floating track pin extending through the lugs for bearing engagement with said bushings and terminating short of the outer ends of said spaced hinge lugs to provide spaces for a supply of lubricant in the lugs, plugs sealing said spaces, and stop pins extending through said spaces adjacent the ends of the track pin to limit its longitudinal floating movement.

JOHN L. DEFFENBAUGH.

REFERENCES CITED

The following references are of record in the file of this patent:

UNITED STATES PATENTS

| Number | Name | Date |
|---|---|---|
| 1,135,560 | Tolles | Apr. 13, 1915 |
| 1,629,818 | Ferris et al. | May 24, 1927 |
| 2,285,870 | Parker | June 9, 1942 |
| 2,332,715 | Herrington | Oct. 26, 1943 |

FOREIGN PATENTS

| Number | Country | Date |
|---|---|---|
| 737,682 | France | Oct. 4, 1932 |
| 396,187 | Great Britain | Aug. 3, 1933 |